US008576843B2

(12) United States Patent
Drottar et al.

(10) Patent No.: US 8,576,843 B2
(45) Date of Patent: *Nov. 5, 2013

(54) PACKET FORMAT FOR A DISTRIBUTED SYSTEM

(75) Inventors: Ken Drottar, Portland, OR (US); David S. Dunning, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/289,863

(22) Filed: Nov. 4, 2011

(65) Prior Publication Data

US 2012/0047305 A1   Feb. 23, 2012

Related U.S. Application Data

(63) Continuation of application No. 12/648,151, filed on Dec. 28, 2009, now Pat. No. 8,068,488, which is a continuation of application No. 09/984,370, filed on Oct. 30, 2001, now Pat. No. 7,639,701, which is a continuation of application No. 09/139,022, filed on Aug. 24, 1998, now Pat. No. 6,333,929, and a continuation of application No. 09/139,021, filed on Aug. 24, 1998, now Pat. No. 6,418,479.

(60) Provisional application No. 60/057,221, filed on Aug. 29, 1997, provisional application No. 60/081,220, filed on Apr. 9, 1998.

(51) Int. Cl.
*H04L 12/28* (2006.01)

(52) U.S. Cl.
USPC .......................................... 370/389; 370/364

(58) Field of Classification Search
USPC ......... 370/402, 389, 472, 473, 476, 471, 362, 370/451, 474, 401, 358, 365, 392
See application file for complete search history.

(56) References Cited

U.S. PATENT DOCUMENTS

| 5,193,189 A | 3/1993 | Flood et al. |
| 5,274,782 A | 12/1993 | Chalasani et al. |
| 5,363,369 A | 11/1994 | Hemmady et al. |
| 5,592,622 A | 1/1997 | Isfeld et al. |

(Continued)

OTHER PUBLICATIONS

William Stallings, "Data and Computer Communications", book, Jan. 1997, pp. 435-442, Fifth Edition, Prentice Hall, Upper Saddle River, New Jersey 07458, http://wwwprenhall.com.

*Primary Examiner* — Brenda H Pham
(74) *Attorney, Agent, or Firm* — Kenyon & Kenyon LLP

(57) ABSTRACT

A method is provided for transmitting a packet including information describing a bus transaction to be executed at a remote device. A bus transaction is detected on a first bus and a network packet is generated for transmission over a network. The network packet includes an opcode describing the type of bus transaction. One or more control signals of the bus transaction map directly to one or more bits of the opcode to simplify decoding or converting of the bus transaction to the opcode. The packet is transmitted to a remote device and the bus transaction is then replayed at a second bus. In addition, the packet includes a data field having a size that is a multiple of a cache line size. The packet includes separate CRCs for the data and header. The packet also includes a transaction ID to support split transactions over the network. Also, fields in the packet header are provided in a particular order to improve switching efficiency.

19 Claims, 5 Drawing Sheets

(56) References Cited

U.S. PATENT DOCUMENTS

| | | |
|---|---|---|
| 5,632,016 A | 5/1997 | Hoch et al. |
| 5,859,980 A | 1/1999 | Kalkunte |
| 5,883,670 A | 3/1999 | Sporer et al. |
| 5,915,104 A | 6/1999 | Miller |
| 5,933,413 A | 8/1999 | Merchant et al. |
| 5,953,511 A | 9/1999 | Sescila, III et al. |
| 5,991,797 A | 11/1999 | Futral et al. |
| 6,044,415 A | 3/2000 | Futral et al. |
| 6,081,848 A | 6/2000 | Grun et al. |
| 6,081,851 A | 6/2000 | Futral et al. |
| 6,081,852 A | 6/2000 | Baker |
| 6,091,710 A | 7/2000 | Mawhinney |
| 6,098,134 A | 8/2000 | Michels et al. |
| 6,112,263 A | 8/2000 | Futral |
| 6,128,684 A | 10/2000 | Okayama |
| 6,144,411 A | 11/2000 | Kobayashi et al. |
| 6,170,025 B1 | 1/2001 | Drottar et al. |
| 6,181,704 B1 | 1/2001 | Drottar et al. |
| 6,219,697 B1 | 4/2001 | Lawande et al. |
| 6,330,599 B1 | 12/2001 | Harvey |
| 6,333,929 B1 * | 12/2001 | Drottar et al. .......... 370/362 |
| 6,418,479 B1 * | 7/2002 | Houssein et al. .......... 709/245 |
| 7,639,701 B2 * | 12/2009 | Drottar et al. .......... 370/402 |
| 8,068,488 B2 * | 11/2011 | Drottar et al. .......... 370/389 |

* cited by examiner

PACKET FORMAT FOR A DISTRIBUTED SYSTEM

CROSS-REFERENCE TO RELATED APPLICATIONS

This application is a continuation of patent application Ser. No. 12/648,151 filed on Dec. 28, 2009 which is a continuation of patent application Ser. No. 09/984,370 filed on Oct. 30, 2001 which issued on Dec. 29, 2009 as U.S. Pat. No. 7,639,701 which is a continuation of Ser. No. 09/139,022 filed Aug. 24, 1998 which issued on Dec. 25, 2001 as U.S. Pat. No. 6,333,929 and Ser. No. 09/139,021 filed Aug. 24, 1998 which issued on Jul. 9, 2002 as U.S. Pat. No. 6,418,479. This application, U.S. application Ser. No. 09/984,370, U.S. application Ser. No. 09/139,022 and U.S. application Ser. No. 09/139,021 claim priority to U.S. Provisional application Ser. No. 60/057,221 filed on Aug. 29, 1997, entitled "Method and Apparatus For Communicating Between Interconnected Computers, Storage Systems, And Other Input/Output Subsystems," incorporated herein by reference, and U.S. Provisional application Ser. No. 60/081,220 filed on Apr. 9, 1998, entitled "Next Generation Input/Output," also incorporated herein by reference.

BACKGROUND OF THE INVENTION

The present invention relates generally to computers, and more particularly to communications between interconnected computer nodes, storage subsystems, and other network devices.

Assessments of server and I/O technologies and their respective marketplaces make clear that cluster communications, including server-to-server communications and server-to-I/O communications, will be increasingly based on a distributed model. Existing server architectures, based on a shared-address-space model, bus-oriented connections to I/O devices and I/O transactions based on a load/store memory model, have limitations.

FIG. 1 illustrates a block diagram of a current generation computer, including CPUs 105 and 110 connected to a host bus 111, CPU 105 is connected to a cache 106 and CPU 110 is connected to a cache 108. The system also includes main memory 109, and one or two host/PCI bridges 112 and 115. Host/PCI bridges 112, 115 convert transactions between host bus 111 and a Peripheral Component Interconnect (PCI) bus 113. A storage controller 324 and several I/O devices 120, 122 and 124 are connected to PCI bus 113. I/O devices 326 are also connected to storage controller 324.

There are limitations on the number of electrical loads which may be placed on the host bus 111. Moreover, these configurations are also limited by the PCI bus 113, which imposes limits both on the number of electrical loads it is capable of supporting and the physical distances at which devices can be placed. As illustrated in FIG. 1, storage connectivity and proximity are typically restricted to what fits within a single enclosure.

An architecture for I/O pass through of the present invention overcomes some of the disadvantages and limitations of prior art computer systems by increasing the number of I/O devices that can be connected to a computer system, by increasing the distance at which the I/O devices are located, and by permitting a more distributed architecture. The distributed computer system of the present invention increases the number of I/O devices and the distance at which they are coupled to host computers, while retaining some of the features of current I/O buses, such as PCI. However, current packet formats are impractical for usage in such a distributed computer system of the present invention. For example, the packet size used in Asynchronous Transfer Mode (ATM) is 53 bytes. However, 53 bytes is very unfriendly for use in a 32 byte cache line. Moreover, current packet formats cannot be easily used to transport host and I/O transactions without requiring significant circuitry for decoding commands or opcodes.

As a result, a need exists for an improved packet format that is more compatible with the distributed computer system of the present invention.

SUMMARY OF THE INVENTION

According to an embodiment of the present invention, a method is provided of remotely executing a bus transaction. The method includes the steps of detecting a bus transaction on a first bus located at a first node and wrapping the first bus transaction in a packet for transmission over a network. The packet includes a data field having a size that is a multiple of a cache line size. In addition, the method includes the steps of transmitting the packet over the network to the second node, unwrapping the first bus transaction from the packet received at the second node and replaying the bus transaction to the second bus for execution.

According to another embodiment of the present invention, a method is provided for transmitting a packet including information describing a bus transaction to be executed at a remote device. The method includes the steps of detecting a bus transaction on a first bus and generating a network packet describing the bus transaction. The network packet includes an opcode describing the type of transaction. One or more control signals of the bus transaction detected on the first bus map directly to one or more bits of the opcode. In addition, the method includes the steps of transmitting the packet over a network to the remote device, receiving and unwrapping the packet at the remote device and replaying the bus transaction on a second bus.

According to another embodiment of the present invention, the transmitted packet includes a header, a data field, a first CRC for the header and a second CRC for the data field. According to another embodiment, the packet includes an opcode and a transaction ID. According to yet another embodiment, the packet header includes a version field, a priority field and an address field.

DETAILED DESCRIPTION

Introduction

Figure 1:
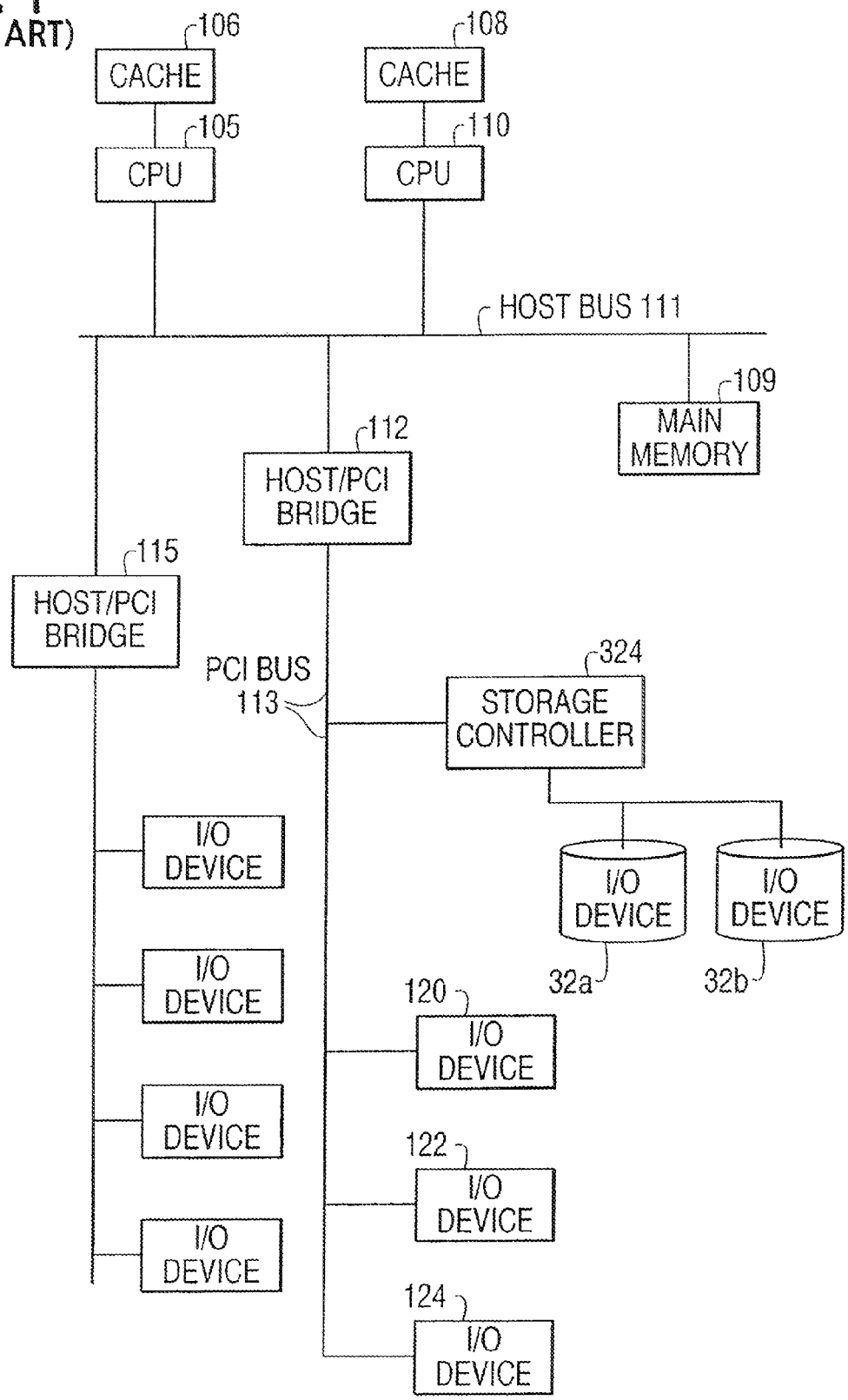
FIG. 1 illustrates a block diagram of a current generation computer.

The distributed computer system of the present invention allows host computers to remotely access one or more I/O systems. The fact that the I/O bus and I/O device are located remote from the host computer is transparent to the host CPU and the I/O device through two new types of bridges that allow transactions to be wrapped in a packet, sent over a network, and replayed at a remote location. According to an embodiment of the present invention, the two new bridges include the NG I/O/host bridge and a NG I/O/PCI bridge. These bridges perform the wrapping and unwrapping of transaction information into packets, and the conversion of received address and control signals from one type of transaction to another (e.g., host transactions and PCI transactions), thereby permitting a distributed arrangement of host computers and I/O systems. The present invention provides the convenience of remote I/O access while maintaining compatibility with current CPU commands, drivers and I/O devices and standards (e.g., compatible with the PCI interface).

Moreover, the packet format of the present invention has several advantages. The packet can include a data field that is a multiple of a cache line size. Also, the packet includes a transaction header and a MAC header. The transaction header includes an opcode describing the type of bus transaction, and a transaction ID (TID) for supporting split transactions across the fabric or network. One or more control signals of the bus transactions map directly to one or more bits of the opcode to simplify converting between the bus transaction and opcodes. In addition, fields in the MAC header may be provided in a particular order to improve switching speed.

Architectural Overview

NG I/O Architecture is a general term to describe systems that are based on the concepts of NG I/O and that employ and NG I/O fabric. The NG I/O fabric is the set of wires and switches that allow two NG I/O devices to communicate. The NG I/O fabric is a standard interface designed to connect server nodes into a cluster and to connect various I/O devices such as storage devices, bridges, and network interfaces. One or more NG I/O "switches," together with a series of links, comprise a "fabric".

An NG I/O link is the wires used to interconnect two points and the accompanying protocol that runs over those wires. The term NG I/O is the chosen acronym for "Next Generation Input/Output." I/O pass through is a method of connecting I/O devices to a computer node, or connecting two computer nodes together, based on load/store memory transactions. An interconnect based on I/O pass through is said to be transparent to the entities at either end of the interconnect. NG I/O (physical) is the minimum set of wires and the protocol that runs on them link that interconnect two entities. For example, the wires and protocol connecting a computer node to a switch comprise a link. NG I/O bundled refers to the capability to connect two or more NG I/O links link together in parallel. Such bundled links can be used to gain increased bandwidth or improve the overall reliability of a given link. NIC refers to a Network Interface Card. NG I/O means Next Generation Input/Output Switch means an NG I/O device that is capable of receiving NG I/O packets (also referred to as I/O or network packets) through one or more ports and re-transmitting those packets through another port based on a destination address contained in the packet. In network terms, a switch typically operates at the data link layer.

Figure 2:
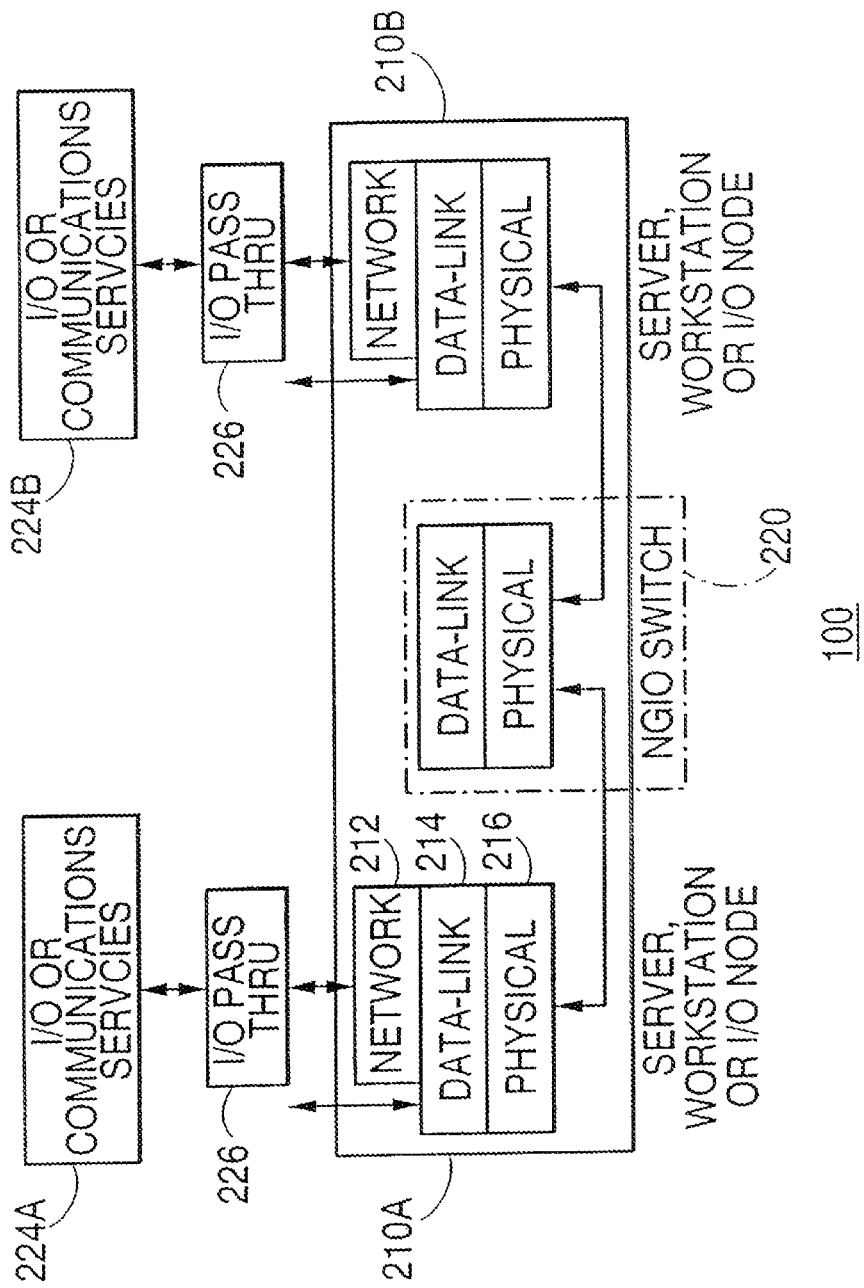
FIG. 2 illustrates the overall NG I/O link architecture according to an embodiment of the present invention.

FIG. 2 illustrates the overall NG I/O link architecture according to an embodiment of the present invention. The overall NG I/O link architecture can be illustrated as including one or more host computers 210 (e.g., servers, workstations, personal computers, or the like), including computers 210A and 210B. The host computers 210 communicate with each other via a (switched) NG I/O fabric that may include a layered architecture, including a network layer 212, a data link layer 214 and a physical layer 216. An NG I/O switch 220 (e.g., including data link 214 and physical layers 216) interconnects the host computers 210A and 210B. Each host computer 210 can communicate with one or more I/O devices 224 (224A and 224B) via the NG I/O fabric using, for example, an I/O pass through technique 226 according to an embodiment of the present invention and described in greater detail below. Thus, the system of FIG. 2 may therefore be considered a distributed computer system because the host computers 210 may be remotely located from the I/O devices 224.

Figure 3:
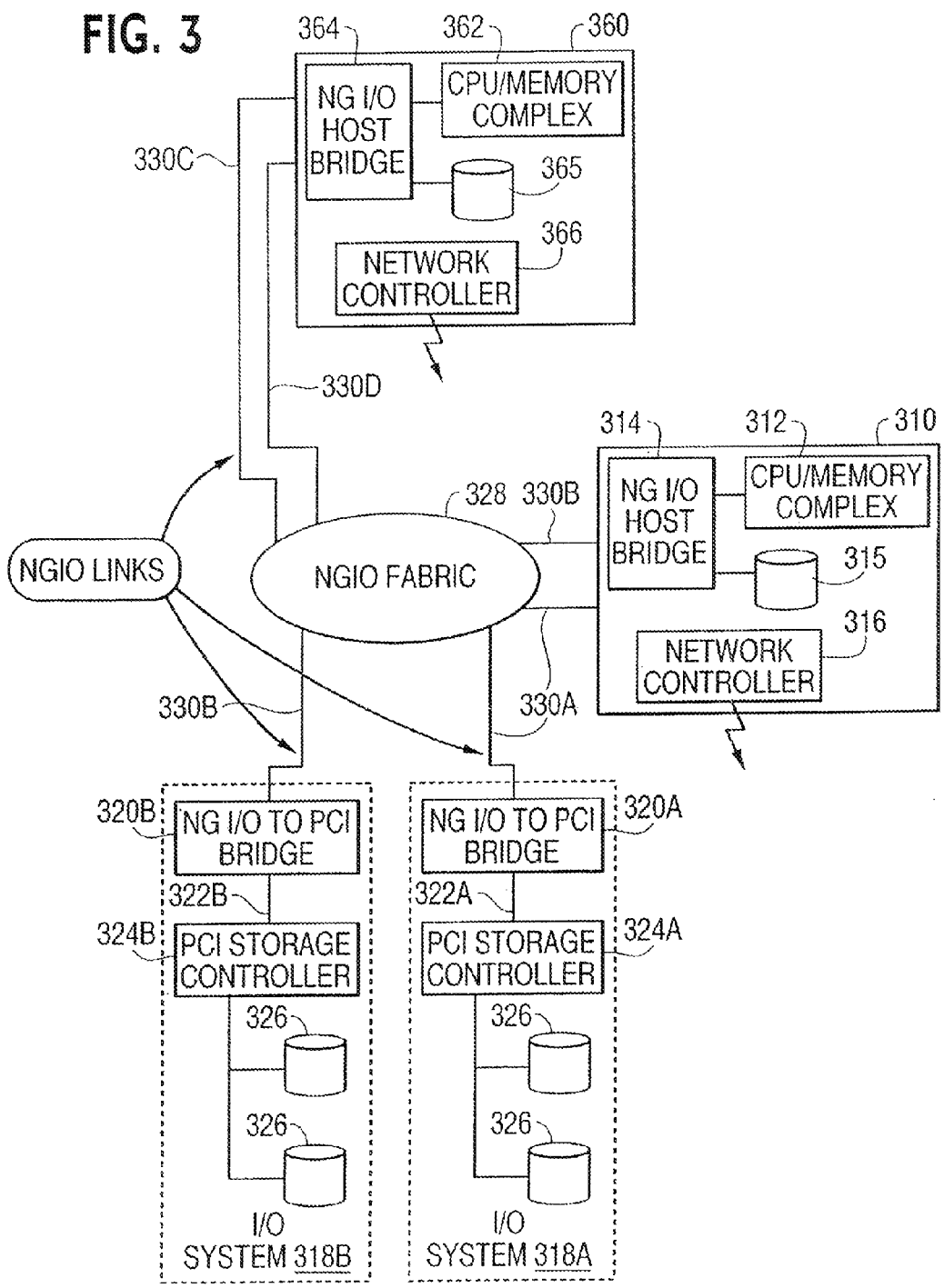
FIG. 3 is a block diagram of an NG I/O architecture for I/O pass through according to an embodiment of the present invention.

FIG. 3 is a block diagram of an NG I/O architecture for I/O pass through according to an embodiment of the present invention. The NG I/O architecture includes multiple host computers, including a host computer 310 and a host computer 360, each which may be a server, workstation, personal computer (PC) or other computer. Host computers 310 and 360 are each interconnected to I/O systems 318A and 318B via a (switched) NG I/O fabric 328, including one or more NG I/O links (e.g., NG I/O links 330A 330B, 330C, 330D). As a result, I/O systems 318 can be remotely located from computers 310 and 360 via fabric 328. Host computers 310, 360, NG I/O fabric 328 and the I/O systems 318 may comprise a System Area Network (SAN). Other host computers and I/O systems (not shown) may also be connected to fabric 328.

Computer 310 includes a CPU/memory complex 312 (including a CPU and main memory typically interconnected via a host bus, not shown), an NG I/O/host bridge 314, secondary memory 315 (such as a hard disk drive), and a network controller 316. For outbound transactions (e.g., information being sent from computer 310 to an I/O system 318), NG I/O host bridge 314 operates to wrap the host transaction in a NG I/O packet for transmission over the NG I/O fabric 328. For inbound transactions (e.g., information being sent from an I/O system 318 to computer 310), NG I/O/host bridge 314 operates to unwrap NG I/O packets (which include data and other transaction information) describing a transaction provided over fabric 328, and then convert the transaction information to a host transaction for replay at computer 310. Like computer 310, computer 360 includes a CPU/memory complex 362, NG I/O/host bridge 364, a secondary memory 365, and a network controller 366. Computer 360 operates in a similar manner to computer 310.

Each I/O system 318 includes, for example, an NG I/O/PCI Bridge 320, a PCI storage controller 324 coupled to the NG I/O/PCI bridge 320 via a PCI bus 322, and one or more I/O devices 326. (As illustrated in FIG. 3, the A suffix identifies components for I/O system 318A, and the B suffix indicates corresponding components of I/O system 318B), For outbound transactions, the NG I/O/PCI Bridge 320 operates to unwrap the data of a NG I/O packet received over the NG I/O fabric 328, and then convert the unwrapped data (e.g., information describing a transaction and data) to a PCI transaction for replay on the PCI bus 322. Likewise, for inbound transactions, NG I/O/PCI Bridge 320 operates to wrap the PCI transaction in a NG I/O packet for transmission over the NG I/O fabric 328 to computer 310.

PCI storage controller 324 operates to control and coordinate the transmission and reception of PCI transactions between PCI bus 322 and I/O devices 326. I/O devices 326 can include, for example, a SCSI storage device, or other I/O devices.

While the embodiment of the NG I/O architecture of the present invention illustrated in FIG. 3 includes a NG I/O/PCI bridge 320, it should be understood by those skilled in the art that other types of bridges can be used. For example, generically speaking, bridge 320 can be referred to as a "network to peripheral bridge" for converting network packets to and from a format that is compatible with I/O bus 322 (bus 322 may be a wide variety of types of I/O or peripheral buses, such as a PCI bus). Likewise, PCI storage controller 324 can be generically referred to as a "peripheral storage controller" for any of several types of I/O devices. Therefore, the present invention is not limited to PCI buses, but rather, is applicable to a wide variety of other I/O buses, such as Industry Standard Architecture (ISA), Extended Industry Standard Architecture (EISA), Accelerated Graphics Port (AGP), etc. PCI is merely used as an example to describe the principles of the present invention. Similarly, NG I/O to host bridge 364 can be generically referred to as a "network to host bridge" because it converts (NG I/O) network packets to and from a host format (host transactions).

FIG. 3 illustrates that an NG I/O fabric 328 can be used to move storage devices out of the server cabinet and place the storage devices remote from the computer 310. Fabric 328 can include one or more point-to-point links between computer 310 and each I/O system 318, or can include a number of point-to-point links interconnected by one or more switches. This architecture permits a more distributed environment than presently available.

I/O Pass Through Operations

According to an embodiment of the present invention, the NG I/O architecture is based on "implicit transactions." In a multi processor, processes communicate implicitly using shared memory.

Implicit transactions are those in which the destination of a particular data or control operation is implied by the physical memory location with which the transaction is associated. The destination of the NG I/O transaction is implicitly specified by the memory operation. NG I/O routing information (e.g., a destination address in the packet header) is derived from the physical address (e.g., host memory address) generated by the processor. According to an embodiment of the present invention, there is a single memory-address space. (In other embodiments of the present invention, multiple processors or host computers are connected, and therefore, include multiple address spaces). Included in the category of implicit transactions are operations that rely on load/store operations to move data between main memory and a storage or network device. As described herein, data transfer and control operations based on implicit transactions will be referred to as "I/O pass through" operations, meaning that they are based on load/store memory accesses (or the like) and, usually contemplate only a single memory address space. In some instances, where there are multiple hosts accessing a common I/O device, there may be an address space for each host. I/O pass through operations are intended to support the attachment of legacy PCI devices to the NG I/O architecture.

According to an embodiment of the present invention, introduction of the NG I/O fabric 328, the NG I/O to host bridge 314 and the NG I/O/PCI bridge 320 (rather than using the standard I/O bridge and bus connection of FIG. 1) between the CPU/memory complex 312 and PCI storage controller 324 allows the I/O systems 318 to be physically removed from the server node box (computer 310) and remotely located, leading to greater connectivity and thus higher overall system throughput. This is the environment for which I/O pass through operations over an NG I/O fabric are intended.

Common to I/O pass through operations are one or more characteristics, including the notion of a single shared address space domain (in some instances), I/O operations based on load and store transactions, and one or more host sever nodes (host computers 310, 360, etc.). Essentially, operations based on implicit transactions allow a physical extension of the standard load and store based I/O subsystem. Physically extending the I/O subsystem provides greater flexibility in initial system design and future upgrades by separating the processor and memory modules from the I/O subsystem. Although physically separate, the I/O platform appears logically integrated.

The single physical address space includes expansion regions for the host and exported I/O platform address maps, including the traditional memory and I/O spaces. A mechanism is also provided to access PCI-compatible configuration space on each device installed in the I/O platform.

To support the attachment of legacy PCI devices to the NG I/O fabric, I/O platform hardware design may include a bridge from the NG I/O fabric to one or more PCI buses (or to other peripheral buses). This configuration allows commercial off-the-shelf PCI-compliant adapters (such as PCI storage controller 324A, FIG. 3) to be installed as bus agents in the I/O platform, providing an effective system-migration path. Maintaining software compatibility with standard PC architectures ensures a logically functional design, although the additional latency incurred by the bridge must be considered to guarantee a successful system implementation.

Protocol

According to an embodiment of the present invention, "protocol" refers to the logical and physical layers of the NG I/O fabric. The data link or logical layer frames packets and sequences physical-layer data flow. The physical layer is the interface between the network medium and network devices. The physical layer defines the NG I/O fabric electrical and mechanical characteristics.

The NG I/O fabric is a standard interface designed to connect server nodes into a cluster and to connect various I/O devices such as storage devices, bridges, and network interfaces. The protocol is intended to operate in an environment assumed to have errors, although not an error prone environment. The protocol provides a means to recover from certain detectable errors.

The protocol comprehends both data and flow control packets. Transactions are split across links, not end-to-end. This effectively posts all operations and dramatically improves network performance. Flow control is credit based. The protocol supports sequencing of packets, which is required to transfer data streams larger than an NG I/O packet size.

The NG I/O protocol is flexible, in that it supports applications based on implicit transactions as well as those based on explicit transactions, as those terms are described above.

The NG I/O protocol provides compatibility features to support PCI devices as well as providing rapid, direct access to host memory. Read and Write operations based on physical addresses (implicit transactions) are supported in three operation domains: memory, I/O, and configuration. In addition, special classes of operation in support of lock and interrupt transport are provided. The list of transaction types supported by the NG I/O protocol includes Memory operations (both explicit and implicit data and control transactions), implicit I/O operations, implicit Configuration operations, Interrupt operations, Locked operations, and Exceptions.

Figure 4:
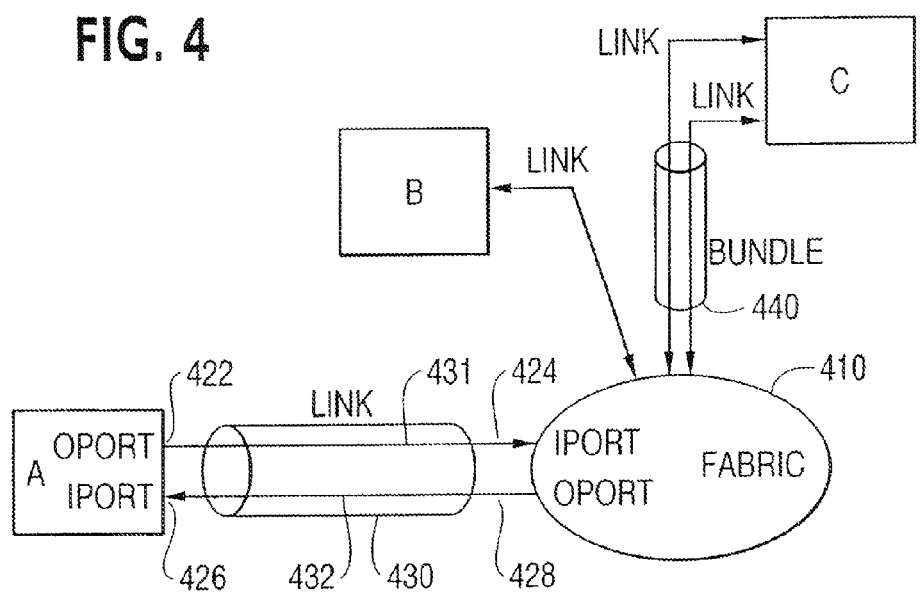
FIG. 4 is a block diagram illustrating NG I/O links according to an embodiment of the present invention.

FIG. 4 is a block diagram illustrating NG I/O links according to an embodiment of the present invention. NG I/O is the protocol, hardware, and software that facilitate communication between network attached devices as illustrated in FIG. 4. A fabric 410 is a set of modules or components connected such that two or more participants can exchange control and data. A link 430 is a bi-directional communication path between two NG I/O connect points in a fabric. An NG I/O fabric is then constructed out of two or more point-to-point links. Multiple links can connect between the same two points, an implementation called bundling (e.g., bundle 440). An NG I/O link 430 includes two unidirectional paths. A unidirectional path 431 of an NG I/O link is connected between an output port 422 of participant "A" and input port 424 of fabric 410; and a unidirectional path 432 is connected between the input port 426 of participant "A" and output port of fabric 410, thereby providing a bi-directional link.

The NG I/O protocol can be used to build a reliable network. NG I/O packets are not be dropped, repeated, corrupted, or re-ordered due to network congestion or transient bit errors. Packets are sent from source to destination, which may be far apart. NG I/O converts one long trip into a series of short trips.

Figure 5:
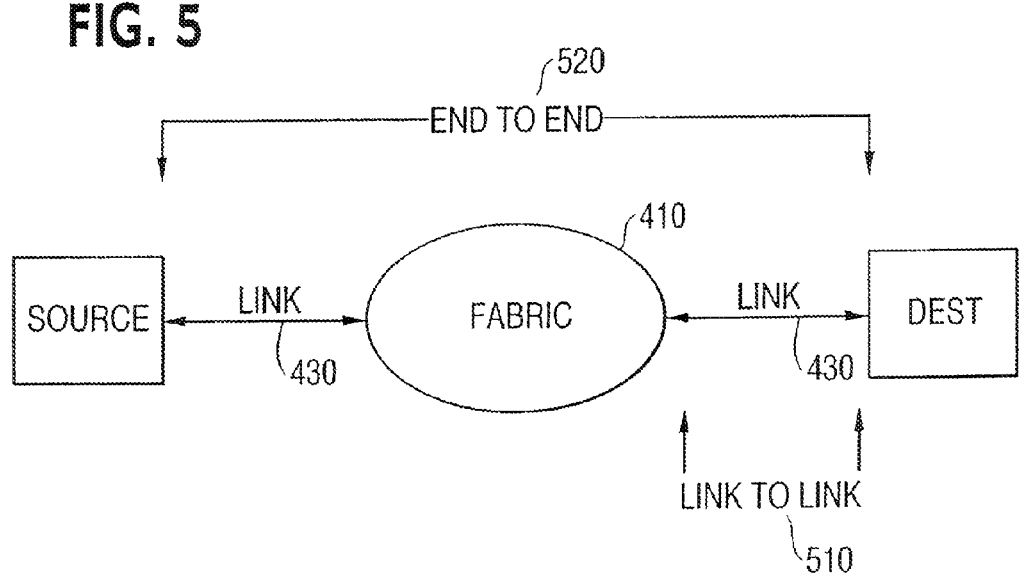
FIG. 5 is a block diagram illustrating application of the NG I/O protocol according to an embodiment of the present invention.

FIG. 5 is a block diagram illustrating application of the NG I/O protocol according to an embodiment of the present invention. Referring to FIG. 5, the NO I/O protocol operates link-to-link 510, not end-to-end 520.

According to an embodiment of the present invention, NG I/O can employ a cut-through routing technique. Like traditional "store and forward" link protocols, packets are buffered as they pass through a link interface. Cut-through minimizes the buffer size required to sustain bandwidth. Unlike traditional protocols, the cut-through link does not have to wait to capture the entire message before forwarding it on to the next link. No additional latency penalty is incurred between link-to-link transfers. Each link sends the packet onto the next link while it checks and acknowledges the packet from the previous link. Each link retains its transmitted packets until acknowledged. Flow control is credit based. Each link retries or de-allocates locally and quickly.

Network Model Stack

To minimize design complexity, modern networks tend to use a layered architecture in which each layer in the hierarchy is a logical entity that performs certain functions. Each layer provides services for the next layer above it and shields the details of how these services are carried out from this higher layer. This hierarchical structure, or stack, performs all tasks and functions required to provide services over the network.

Figure 6:
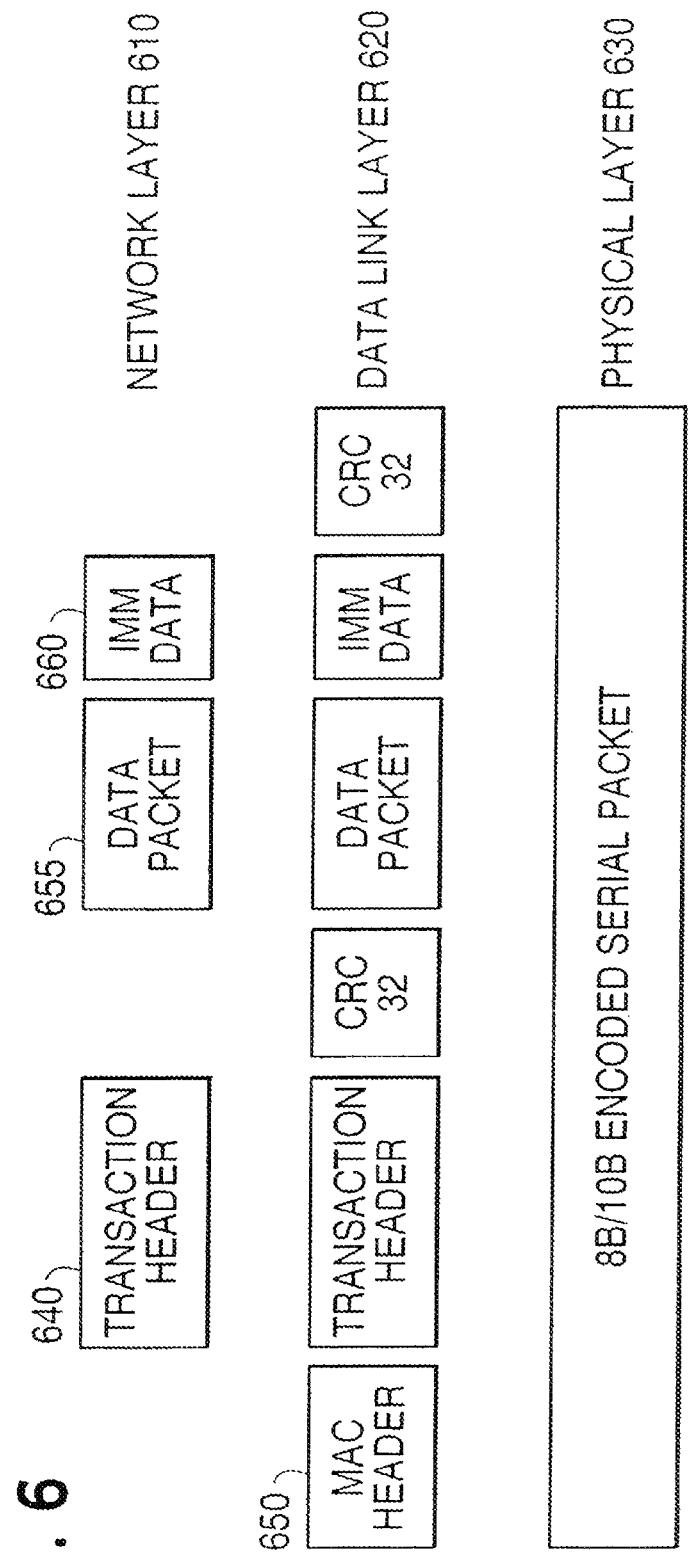
FIG. 6 is a diagram illustrating the NG I/O layers according to an embodiment of the present invention.

FIG. 6 is a diagram illustrating the NG I/O layers according to an embodiment of the present invention. NG I/O implements a network layer 610, a data link layer 620 and a physical layer 630 as illustrated in FIG. 13.

The network layer 610 completes the definition of the interaction between host and network. It accepts a transaction from a transport layer access service point. It then adds a correctly formatted transaction header, identifying the operation type and destination, to each data packet handed it by the transport layer. The network layer 610 also provides the address that is used to steer the transaction through the fabric and passes the transaction to the NG I/O data link layer.

The data link layer 620 accepts a transaction from the network layer access service point and creates a media access control header (MAC). The data link layer 620 creates the CRC-32 checksums that accompany packets. The data link layer provides the final framing and encoding of packets for the physical media. The data link layer controls link layer data flow. Its responsibilities also cover synchronization, reset, and initialization. The data link layer 620 implements the mechanisms that allow bundling, redundancy, and auto discovery. The data link layer 620 also manages link-to-link acknowledges, detects transmission errors and retransmits packets when necessary.

The physical layer 630 accepts a transaction from the data link layer access service point, buffers that transaction to match the physical interface components, and passes the transaction to the NG I/O fabric for transmission.

Transactions

As shown in FIG. 3, I/O devices 318 are located remote from the host computer 310 and emulate the operation of a local PCI bus. This is called I/O pass through mode because the transactions are, in effect, passed through the network (e.g., NG I/O fabric 328) to be replayed at the destination point. In particular, according to an embodiment of the present invention, a transaction is wrapped in a packet, transmitted to the destination point, and then a local transaction (e.g., either a host transaction or a PCI transaction) is generated based on the received transaction data. Specifically, these transactions are intended to provide support of legacy PCI devices.

Implicit Transactions

It is the intention that transactions pass seamlessly through the NG I/O protocol. Physical address loads and stores are supported in three operation domains: memory, I/O, and configuration. In addition, special classes of operation in support of lock and interrupt transport are provided.

For load/store operations, the network layer 610 uses the destination physical address associated with each transaction to deliver a packet to the destination. The network software layer must configure the hardware to match address ranges with associated network addresses. A thin layer of hardware reads the opcode stating the transaction and destination address to direct the transaction to the destination. There is no requirement for fragmentation or reassembly of data.

Error Handling

Cabled networks over distance are considered a noisy/error-introducing, but not necessarily an error-prone environment. Any protocol that chooses this type of media for its messages must enable the receiver to determine whether the message has been corrupted. NG I/O 256-byte data transmit packets are protected by 8 B/10 B-encoded redundancy and two CRC-32 checksums. There is a checksum for both the header and the data. Performance can be improved when the header has its own checksum—the header can be decoded and checked early, before the arrival of data. It there are no side effects, initiation of the message at the receiver becomes pipelined with the data reception.

Receiving links keep track of the last successfully completed packet sequence. Each received packet is decoded and the CRC is checked. An identified transmission error generates a retry to the previous link. The retry is a negative acknowledge (NAK) of the first bad packet. This implies all previous packets were good and all subsequent packets must also be retried. The flow control is included in the MAC header and can be appended to a packet in transit or sent as its own packet, After receiving the NAK, the transmitting link restarts at the specified sequence and de-allocates previous packets. This mechanism repairs transient faults. A retry counter is available. An unsuccessful re-transmit sequence, as configured by the fabric manager, generates an exception/interrupt packet sent upstream (back to the source). In the event that the source is not available, the packet will be directed to the fabric manager. The transport layer is notified. A non-recoverable error is generated.

Each link has configurable retry and timeout counters. When a link develops a permanent fault, failing on several retries (the amount is configurable) or failing to respond (the interval is configurable), the device shuts down the link, preventing it from carrying any further traffic. The undeliverable packet is sent back to the source with an appropriate error condition appended to the fabric control field of the MAC. When the transport layer is appraised of the problem it sends one last packet, flushing the failing path. The transport layer will then change its routing table to remove this failed path. When the flush packet returns, the transport layer knows all packets from the queue have been recovered in order.

According to an embodiment of the present invention, the transport layer may be able to map an alternative route for returned packets to their proper destination. The transport layer may employ a fabric-aware device to test the failing link status and choose to restore and re-initialize partial restricted functionality to the failed link. A transport layer could use a fabric-aware device to continually poll the failing link, re-enabling the pathway when link integrity is restored.

Protocol Characteristics

NG I/O protocol uses link-based flow control. This means each link transmitter must retain packets until such time as they are acknowledged by the link receiver. Depending on the type of acknowledgment, the transmitter will then either retry or de-allocate the packets.

NG I/O flow control is credit based. At power up, each end of a link determines buffer size, deferring to the smaller implemented buffer if size is different. A transmitter will not send a packet unless buffer space at the receiver is available. Transmitter and receiver also synchronize on width of the link ID counter.

Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended (piggy-backed) to a packet assembled for transmission back.

Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets.

In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

Link Bundling

In some NG I/O network configurations, bandwidth demands may exceed the capabilities of a single link. According to an embodiment of the present invention, NG I/O protocol provides a method to remove the single-link bottleneck. Multiple links can connect between the same two points in the fabric. This is called bundling. Bundling is accomplished by striping packets byte-wise over the available, multiple redundant links. This improves speed matching and reduces latency between these high-performance end points. NG I/O hardware does not distribute bandwidth (load balance) or route whole packets on an available-link basis. Load balancing, if it occurs, is the responsibility of higher network stack layers.

Any number of links can be gathered together as a bundle. The order in which the bytes are striped across bundled links maintains a configured ordering and ID. All transactions across striped, bundled lines are always initiated on logical link 0. Packets that are not a multiple of the link bundle are expected to add a null character for alignment purposes on remainder links.

Bundling is not effective for individual packets with no congestion unless the size of the bundle is consistent from source to destination through the fabric. If the size of the bundle is not consistent through the fabric, bandwidth is constrained to that of the weakest link. If the size of the bundle is not consistent through the fabric, transitional devices must store and forward rather than cut-through, adding latency.

Depending on system connectivity options, an NG I/O fabric manager may choose to configure bundled links. Bundling is an optimized, advanced configuration. All NG I/O links initialize to single operation with only logical link 0 functioning, even if multiple redundant links exist. A bundle is treated as a single, high-bandwidth link. If any link of a bundle fails, the high-bandwidth link is failed. Recovery of a failed link is possible, but strongly dependent on implementation choices.

Link Buffering

NG I/O links support link-to-link flow control on packets. Each packet is forwarded, decoded, tested for validity, and stored by each link (in the order). Although a copy of each packet is buffered, the original packet is passed through an NG I/O interface as quickly as possible. The end result is link behavior usually described as "cut-through" routing strategy. This minimizes latency as the packet moves through the fabric. Each acknowledge or negative acknowledge returned to the transmitter de-allocates or retries the buffered packet. To sustain maximum NG I/O bandwidth, each link must possesses enough buffering to cover the link-to-link transmit-acknowledge cycle.

Transaction Ordering

Packets are ordered strongly while sharing the physical queue structures within each interface. The NG I/O protocol guarantees multiple packets in a given sequence from one source will arrive in order to one destination. However, even within these queues, each transaction is treated as originating from independent streams. NG I/O does not guarantee sequential transaction ordering from one source to many destinations. If separate destinations on NG I/O are expected to act in concert, initiated by NG I/O transactions, through a sideband communication channel, each transaction must be followed by another with end-to-end acknowledge behavior (like a read) to guarantee proper serialization of the command sequence.

Flow Control

NG I/O protocol uses link-based flow control. This means each link transmitter must retain packets until such time as they are acknowledged by the link receiver. Depending on the type of acknowledge, the transmitter will then either retry or de-allocate the packets.

NG I/O flow control is credit based. At power up, each end of a link determines buffer size, deferring to the smaller implemented buffer if size is different. A transmitter will not send a packet unless buffer space at the receiver is available. Transmitter and receiver also synchronize on width of the link ID counter.

Each link transmitter assigns an ordered ID (beginning with zero) to each sent packet. The link receiver tests the checksum of each delivered packet. If the packet tests with no error, the receiver sends a positive acknowledge (ACK) back to the transmitter. Flow control is either contained in its own packet or is appended to a packet assembling for transmission back.

Some period of time can be consumed while the receiver attempts to acknowledge the transmitter. In the interests of efficiency, a receiver can ACK out-of-order to de-allocate buffer space for the named transaction and any other sequentially previous transactions outstanding at the transmitter. In exchange for this performance benefits, the receiver assumes responsibility for tracking transmit ID sequence. This audition activity reduces the opportunity for undetected packets.

In the case of negative acknowledge (NAK), the transmitter may still de-allocate for sequentially previous transactions. NAK instructs the transmitter to resend the indicated packet and any packets that have been sent since then. Each transmitter has a configurable interval timer for the link acknowledge cycle. Each transmitter has a configurable iteration counter for NAK. Rather than congest the link, a transmitter that has run through either counter is obliged to return the undeliverable packet to its source.

Packet Format

Referring to FIG. 6, an NG I/O packet has two headers, one prepared by the network layer 610 called the transaction header 640 and one prepared by the data link layer 620 called the media access control (MAC) header 650. The transaction header 640 is assembled once at the source and disassembled once only at the destination. The media access control (MAC) header 650 holds fabric-specific information. It is assembled, recoded, and disassembled at each link (or at each switch). These two headers are protected with a 32-bit CRC, which is recalculated and appended by the data link layer at each instance.

The NG I/O network layer 610 segments a data stream into packets of 256 or fewer bytes. Segmented streams are reassembled by the destination network layer 610. There is also an option to include an immediate data field 660 after the data packet 655. These two data fields are also protected with a 32-bit CRC. (In other words, the data field is protected with its own 32-bit CRC). The data and immediate data packets and their associated CRC-32 are created at the source and not altered until reception by the network layer at the destination.

The network layer 610 adds a transaction header 640, identifying the operation type and destination, to each data packet handed to it by the transport layer.

This result is this format of the data as it distributes serially down to the data link layer. The data field can be from zero to 256 bytes.

| Transaction Header 11 bytes | Data 0-256 bytes | Immediate Data 4 bytes |
|---|---|---|

The format for the transaction header for implicit (I/O Pass-through) mode is:

| opcode [7:0] | be [15:0] | a [63:2] | lock [1:0] |
|---|---|---|---|

The fields of the transaction header are defined as follows:
opcode Defines the transaction type and determines how the rest of the transaction header is to be interpreted. All undefined opcodes are reserved.
be Byte enables for the first 16 bytes of the data packet. Supports a prologue, beginning of a data transfer up to the next boundary, up to 16 bytes. Does not directly support an epilogue, end of a data transfer past the last 16-byte boundary. Epilogue support is inferred from the MAC length field. According to an embodiment of the present invention, n I/O pass-through mode, there is a limitation of one packet per transaction ID (TID). The packet must fit consecutively within sixteen 16-byte partitions. This implies that an unaligned data packet may be further constrained in length than 256 bytes.

a Address—64-bit addressing is supported.

lock Identifies a special I/O pass through transaction.

| Lock | Definition |
|---|---|
| 00 | no lock |
| 01 | lock request |
| 10 | from source, lock in progress; from destination, lock grant. |
| 11 | unlock |

According to an embodiment of the present invention, the opcodes and corresponding transactions are assigned as follows:

| Opcode | Transaction |
|---|---|
| 00000000 | Memory Read |
| 00000001 | Memory Write |
| 00000010 | I/O Read |
| 00000011 | I/O Write |
| 00000110 | Read Response |
| 00000111 | Write Response |
| 00001000 | Reserved |
| 00001000 | Reserved |
| 00010001 | Configuration Read |
| 00100000 | Configuration Write |
| 00100000 | Flow Control |
| 01xx0000 | Send |
| 01xx1000 | Send Immediate |
| 01xx0010 | RDMA Read Request |
| 01xx1010 | RDMA Read Request Immediate |
| 01xx0011 | RDMA Write |
| 01xx1011 | RDMA Write Immediate |
| 01xx0110 | RDMA Read Response |
| 01xx1110 | RDMA Read Response Immediate |
| Xx1xxxxx | First Packet Of A Large DMP Transfer |
| Xxx1xxxx | Last Packet Of A large DMP Transfer |
| 1xxxxxxx | Reserved |

The Media Access Control header is added to each transaction by the data link layer.

The result is this format and order of data as the transaction is passed serially down to the physical layer:

| MAC Header 11 bytes | Transaction 11 bytes | Header CRC 4 bytes | Data 0-256 bytes | Immediate Data 4 bytes | Data CRC 4 bytes |
|---|---|---|---|---|---|

The MAC header 650 is assembled, disassembled, and usually modified at each intermediate link. To save time and bandwidth, local link control can be appended to the MAC header of a transaction in progress.

The format of the MAC header is:

| version [3:0] | pri/type [3:0] | src/dest [31:0] | fabcnt [7:0] | length [8:0] | reqid [9:0] | ack/ nak# | cmpid [9:0] | reserve [9:0] |
|---|---|---|---|---|---|---|---|---|

The fields of the MAC header are as follows:
version Of the NG I/O protocol

| Version | Definition |
|---|---|
| 0000 | Initial Implementation |
| 0001 | Reserved for Future Use |
| ... | Reserved for Future Use |
| 1111 | Reserved for Future Use | priority/type Of the transaction. This field can be used to identify different priority transactions, virtual channels, or in support of other network protocols over NG I/O.

| Pri/Type | Definition |
|---|---|
| 0000 | Priority Zero Packet (Lowest) |
| 0001 | Priority One Packet |
| 0010 | Priority Two Packet |
| 0011 | Priority Three Packet (Highest) |
| 0100 | Reserved/TBD |
| ... | Reserved/TBD |
| 1111 | Reserved/TBD | src/dest Defines route or endpoints of the transaction through the fabric. Each source and destination is unique for a network total of 65,635 endpoints. This field may have different formats depending on NIC and fabric implementations.
fabcntl Fabric control, identifies special transactions such as management frames for switches within the fabric. Implementation dependent.
length Number of bytes units in data packet, irrespective of byte marks. This number includes the immediate data field, if any.
reqid Request ID number for transactions, also sequence numbers for associated port.
ack/nak# Defines how the cmpid is being acknowledged.
cmpid ID number of the last packet acknowledged on that port.

Advantages of the NG I/O Packet Format

There are several advantages of the unique packet format according to an embodiment of the present invention. The packet format of the present invention can advantageously include one or more of the following features:

1. The Data Payload Size should be a Multiple of the Cache Line Size

According to an embodiment of the packet format of the present invention, the size of the data field is a multiple of the cache line size. The minimum that can be read from or written to memory is one cache line. For example, in many computers the cache line size is 32 bytes. Thus, if there is a read or write of, say, 40 bytes, then two full cache lines (64 bytes) must be read or written, resulting in a partial waste of CPU resources (because only 8 of the 32 bytes of the second cache line provide actual data). Thus, for a 32 byte cache line, the data payload of an NG I/O packet should be a multiple of 32 bytes (e.g., 32, 64, 96, 128, or 256 bytes) to ensure efficient use of CPU resources. According to an embodiment of the present invention, the data field or data payload is 256 bytes. By making the data payload of an NG I/O packet a multiple of the cache line size of the host computer, the NG I/O packet format is cache line friendly. Thus, read or write operations to and from the memory or cache will be performed as one or more cache line operations, with no left over data.

2. NG I/O Opcodes should Include Bits that Map Directly to Host or I/O Control Signals When a host transaction is detected on the host bus and is then wrapped in a NG I/O packet (for transmission to the remote I/O system), an opcode is generated for the NG I/O packet that describes the transaction. To convert the host command generated by the host computer during the host transaction to an NG I/O opcode requires decoding circuitry or a conversion process to generate the NG I/O opcode based on the host command. Similarly, after a PCI transaction is detected at a remote I/O system that is addressed to a host computer, an NG I/O opcode is generated to describe the PCI transaction. This requires decoding or conversion circuitry to convert the PCI command or transaction to a corresponding NG I/O opcode. Thus, decoding circuitry is required to convert between host or PCI control signals and NG I/O opcodes.

According to the packet format of the present invention, the NG I/O opcodes include one or more bits that map directly to host control signals (describing the host command or transaction) and/or one or more bits that map directly to PCI control signals. By directly mapping at least some of the control signals for host and PCI transactions to the NG I/O opcodes, the process of converting the host or PCI commands or transactions to and from a corresponding NG I/O opcode is simplified. As a result, the decoding circuit required to generate the NG I/O opcodes is greatly simplified because a portion of the host or PCI commands or control lines map directly to specific bits of the NG I/O opcodes. For example, according to an embodiment of the present invention, certain bits in the NG I/O opcodes map directly to control lines for Intel Architecture Labs (IAL) commands provided by the CPU onto the host bus during a host transaction.

For example, referring to the table of opcodes provided above, for some opcodes (including memory read, memory write, I/O read and I/O write), the least significant bit is a zero ("0") to indicate a read and a one ("1") to indicate a write. Therefore, this least significant bit corresponds or maps directly to the read/write control signal generated by the host CPU during host transactions. The next most significant bit is a zero ("0") to indicate a memory transaction and is a one ("1") to indicate an I/O transaction for these same four NG I/O opcodes. Likewise, other control signals may map directly from the host command to corresponding bits of the NG I/O opcodes to reduce the complexity of the decoding or conversion logic used for converting between host commands and NG I/O opcodes.

With respect to the PCI side, there are three types of PCI transactions: memory. I/O and configuration. According to an embodiment of the present invention, as one example, one bit in at least some of the NG I/O opcodes is a zero ("0") to indicate a read or write PCI transaction, and is a one ("1") to indicate a configuration type transaction. This bit would be used to either set or clear a corresponding "configuration" control signal that is set on the PCI bus during a configuration type PCI transaction. Other bits in the NG I/O opcodes can be mapped to PCI control signals to reduce the decoding or conversion logic used for converting between PCI commands or control signals and NG I/O opcodes.

3. The NG I/O Transaction Header can Include Both an Opcode and a Transaction ID (TID)

The NG I/O transaction header includes an opcode and a transaction ID. The opcode describes the type of operation (e.g., memory read or write, I/O read or write, configuration read or write, RDMA read or write). In addition, transactions are preferably performed across the NG I/O fabric 328 as a split transaction. For example, for an inbound read transaction (a read from a PCI device to host memory), the NG I/O/PCI bridge 320A generates the appropriate headers (e.g., transaction header and MAC header) for the NG I/O packet based on the PCI transaction. The transaction header includes an opcode describing the type of operation. The NG I/O/PCI bridge 320A also generates a transaction ID (TID) to identify and keep track of this transaction. The TID is provided in the transaction header. The NG I/O/host bridge 314 receives and decodes the NO I/O packet, by replaying the read request to the host memory via the host bus. (The NG I/O/host bridge 314 also temporarily stores the TID of the received packet).

In response to replaying the read transaction over the host bus, the NG I/O/host bridge 314 receives the data from memory and assembles a reply packet, including the requested data and the appropriate headers. The NG I/O/host bridge 314 inserts the same TID (same as the read packet) into the transaction header of the reply packet to allow the remotely located NG I/O/PCI bridge 320A to match the enclosed data to a particular read request from the PCI device. According to an embodiment of the present invention, the NG I/O/PCI bridge 320A then matches the TID to a particular PCI address (The original PCI address of the read request). When a PCI device repeats its read request over the PCI bus, 322A, the NG I/O/PCI bridge 322A outputs the requested data onto the PCI bus. In this manner, the TID is used to allow the bridges 314 and 322A to keep track of split transactions over the NG I/O fabric 328.

Outbound transactions (e.g., host CPU read or write to a remote PCI device) operate in a similar manner, with the NG I/O/host bridge 314 generating a TID for the request packet. The NG I/O/PCI bridge 322A appends the same TID to the reply packet to allow the NG I/O/host bridge 314 to match reply data with the outstanding request. While TIDs are commonly used in standard computers, TIDs are not used in packets or cells transmitted over a switched network.

4. The NG I/O Packet Includes a Data CRC and a Header CRC

As described above, the NG I/O packet format includes cyclic redundancy check (CRC) over the data field. The NG I/O packet also includes a separate CRC calculated over one or more (or both) of the transaction header and MAC header. By using two CRCs, the packet format of the present invention provides improved reliability and error detection over packets that use only a single CRC.

5. MAC Header Fields are Ordered for Processing Efficiency

The fields in the MAC header are provided in an order in which they should be examined or processed by a switch to improve the efficiency and speed of the packet header processing at each intermediate node or switch (e.g., to improve packet switching speed). Referring to the fields of the MAC header described above, the MAC header includes, for example, the following fields: a version field (e.g., version of the protocol, etc.), a priority field (priority of the packet) and a source/destination address field, followed by other fields.

The version field is provided first in the MAC header because the version will indicate how the remaining fields should be interpreted by the switch (e.g., different versions could even have additional fields added, or have fields with different meanings). Thus, the switch should first analyze the version of the protocol to determine how to interpret the remaining fields.

The priority field is provided second in the MAC header (e.g., identifies whether the packet is high priority or low priority). The priority field can be used by a switch to determine which packet should receive forwarding resources first. For example, in the event of network congestion and where two packets are received at the same time, the switch would forward the higher priority packet first. Alternatively, in the event of network congestion, the switch could simply discard the lowest priority packets, thereby avoiding the need for further processing of the lower priority packet. The priority field can be used for a variety of functions.

The third field is the source and destination network addresses (e.g., the network addresses of the NG I/O host bridge 314 and the NG I/O/PO bridge 320). These addresses define the endpoints or route of the packet through the fabric 328. The switch (in the NG I/O fabric 328) looks up the destination address in a forwarding table to identify the appropriate output port for forwarding the packet. According to an embodiment of the present invention, several other fields are provided after the source/destination address field. In this manner, a switch may first examine a version field to determine how to interpret the other fields; second, analyze the priority field to determine processing priority (e.g., discard lowest priority packets during congestion); and third, analyze the destination address to look up in a forwarding table for forwarding the packet.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A non-transitory computer readable medium storing instructions that when executed by a processor perform a method of communicating a bus transaction, the method comprising:
  detecting a bus transaction;
  wrapping the bus transaction in a packet for transmission over a network; and
  transmitting said wrapped packet over said network;
  wherein said packet includes an opcode describing the type of bus transaction, and one or more control signals of the bus transaction map directly to one or more bits of the opcode.

2. The computer readable medium of claim 1, wherein said bus transaction relates to access to nonvolatile memory.

3. The computer readable medium of claim 1, wherein the bus transaction comprises a PCI bus transaction.

4. The computer readable medium of claim 1, wherein the wrapped packet will be transmitted to a storage unit.

5. The computer readable medium of claim 1, wherein said packet includes a data field and a header.

6. The computer readable medium of claim 5, wherein said packet includes a first CRC for the data field and a second CRC for the header.

7. The computer readable medium of claim 5, wherein said header includes a version field describing a version of a protocol, a priority field describing a priority of the packet, and a source/destination field.

8. The computer readable medium of claim 1 wherein said packet includes a data field having a size that is a multiple of a cache line size.

9. A non-transitory computer readable medium storing instructions that when executed by a processor perform a method of communicating a bus transaction, the method comprising:
   receiving from a network a packet that wraps a bus transaction;
   unwrapping the packet to generate the bus transaction; and
   executing the bus transaction;
   wherein said packet includes an opcode describing the type of bus transaction, and one or more control signals of the bus transaction map directly to one or more bits of the opcode.

10. The computer readable medium of claim 9, wherein said packet includes a data field and a header.

11. The computer readable medium of claim 10, wherein said packet includes a first CRC for the data field and a second CRC for the header.

12. The computer readable medium of claim 10, wherein said header includes a version field describing a version of a protocol, a priority field describing a priority of the packet and a source/destination field.

13. A non-transitory computer readable medium storing instructions that when executed by a processor perform a method of preparing a bus transaction for remote execution, the method comprising:
   detecting a bus transaction on a bus located at a first node; and
   wrapping the bus transaction in a packet for transmission over a network, the packet including an opcode and a destination address;
   wherein the destination address identifies a memory location associated with the bus transaction at a second node.

14. The computer readable medium of claim 13, further comprising:
   storing the packet in a buffer;
   transmitting the packet over the network to the second node;
   if a positive acknowledgement is received, reallocating the buffer; and
   if a negative acknowledgement is received, retransmitting the packet.

15. The computer readable medium of claim 13, wherein said packet includes a transaction header including the opcode and the destination address, a first CRC for the transaction header, a MAC header, and a second CRC for the MAC header.

16. The computer readable medium of claim 13, wherein said packet includes a header, the header including a version field identifying a version of a protocol, a priority field identifying a priority of the packet, and an address field.

17. The computer readable medium of claim 13, wherein one or more control signals of the bus transaction detected on the bus map directly to one or more bits of the opcode.

18. A non-transitory computer readable medium storing instructions that when executed by a processor perform a method of executing a bus transaction for remote execution, the method comprising:
   receiving a packet at a first node on a network, from a second node on the network, the packet including an opcode and a destination address, wherein the destination address identifies a memory location associated with the bus transaction at the first node;
   testing a checksum associated with the packet;
   transmitting an acknowledgement to the second node according to the checksum test; unwrapping the bus transaction from the packet; and
   generating a local bus transaction, based on the received bus transaction, on a bus of the first node.

19. The computer readable medium of claim 18, wherein one or more bits of the opcode map directly to one or more control signals of the bus transaction executed on the bus.

* * * * *